United States Patent [19]

Plamper

[11] 4,333,303
[45] Jun. 8, 1982

[54] CLUTCH AND BRAKE MECHANISM

[75] Inventor: Gerhard R. Plamper, Valley City, Ohio

[73] Assignee: MTD Products Inc., Cleveland, Ohio

[21] Appl. No.: 174,681

[22] Filed: Aug. 1, 1980

[51] Int. Cl.³ .................. A01D 69/08; F16D 67/02
[52] U.S. Cl. ...................... 56/11.3; 192/14; 192/16; 192/18 R
[58] Field of Search ............... 192/14, 17 R, 16, 8 A; 56/11.3

[56] References Cited

U.S. PATENT DOCUMENTS

| | | | |
|---|---|---|---|
| 3,352,176 | 11/1967 | Brundage | 192/18 R |
| 3,420,343 | 1/1969 | Stiepel | 192/18 R |
| 4,141,439 | 2/1979 | Lunde et al. | 192/18 R |
| 4,205,509 | 6/1980 | Miyazawa et al. | 56/11.3 |
| 4,213,521 | 7/1980 | Modersohn | 56/11.3 X |
| 4,226,313 | 10/1980 | Meldahl et al. | 192/18 R |
| 4,286,701 | 9/1981 | MacDonald | 192/18 R |

*Primary Examiner*—George H. Krizmanich
*Attorney, Agent, or Firm*—Woodling, Krost & Rust

[57] ABSTRACT

A clutch and brake mechanism for a rotary type lawn mower or the like in which a brake plate (28) is movable away and toward friction elements (27) to engage the same, which friction elements (27) are also engageable by a clutch plate (16), the surfaces of the friction elements (27) being arranged to provide that braking and clutching may occur alternately.

18 Claims, 10 Drawing Figures

CLUTCH AND BRAKE MECHANISM

FIELD TO WHICH INVENTION RELATES

My invention relates to a clutch and brake mechanism particularly for the concurrent braking and de-clutching of a rotatable working element and for the concurrent unbraking and clutching of the working element. It is especially suitable for a rotary-type lawn mower so that the working element, the rotating blade, is braked against rotation at substantially the same time that the blade is declutched from the driving shaft of the mower motor and so that the blade is clutched to rotate with the shaft at substantially the same time that the blade is unbraked and permitted to rotate.

BACKGROUND ART OF THE INVENTION

The related background art known to the applicant but which does not teach, disclose, or suggest the present invention, includes the following patents:

U.S. Pat. No. 3,871,159—Charles R. Shriver;
U.S. Pat. No. 4,035,994—Stephen J. Hoff;
U.S. Pat. No. 4,141,439—James M. Lunde et al.;
U.S. Pat. No. 4,148,173—Stephen J. Hoff;
U.S. Pat. No. 4,205,509—Takeshi Miyazawa et al.;

STATEMENT OF THE INVENTION

It is an object of the invention to provide an improved clutch and brake mechanism of relatively simple and economic construction which provides for quick and efficient substantially concurrent braking and de-clutching of a rotatable working element, such as the blade of a rotating type lawn mower, and the substantially concurrent unbraking and clutching of the rotatable working element.

It is a further object to assure that the motor-driven rotatable working element, such as the blade of a rotating type lawn mower, does not continue to rotate for any appreciable length of time after the working element is de-clutched and no longer being motor-driven.

Another object is to improve safety in the use of machines having rotatable working elements such as rotating type lawn mowers having blades driven by the mower motor.

A further object is to facilitate the control of the rotation of a motor-driven rotatable working element, such as the blade of a rotary type lawn mower, by use of a "dead-man" control, by assuring that the rotation of the rotatable working element by the still operating motor stops very quickly after the "dead-man" control is released.

Another object is to provide more responsive control of the rotation of a rotatable working element, such as the blade of a rotary type lawn mower, to assure that upon de-clutching of the working element from a driving motor, the rotation of the working element is almost simultaneously braked to discontinue rotation, and also to assure that upon clutching of the working element to the driving motor, the working element is not braked but is free to rotate.

Other objects and advantages may be observed from the following description of the invention in conjunction with the several drawings.

The present invention is here described in connection with its use in a rotary type lawn mower having a motor driven rotatable blade for which it is especially adapted, although it is also useful in connection with other machines having a motor driven rotatable working element. The best and preferred embodiment of the invention as presently known to the inventor is as herein disclosed.

Figure 1:
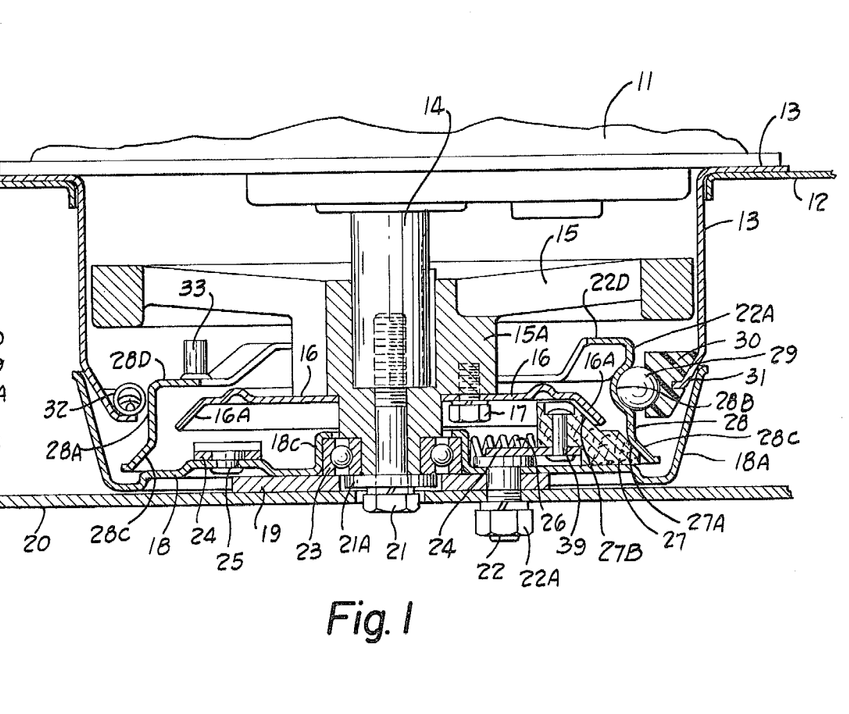
FIG. 1 is a longitudinal sectional view taken through the improved clutch and brake mechanism and illustrating the parts in braked and de-clutched positions.

The lawn mower to which the invention is here applied has a motor or engine 11, which may be an internal combustion type motor or an electric motor, which is mounted on a mower housing 12. A fragmentary portion of the housing 12 and motor 11 is shown in FIG. 1. The housing 12 has a downwardly extending cylindrical portion forming a cup member 13 on the under portion of the housing 12 proper. The cup member 13 may be bolted, welded or otherwise secured to the housing 12 proper.

The motor 11 has a vertically extending shaft extending downwardly therefrom and in the usual manner the motor 11 drives the shaft 14 to rotate therewith.

Figures 5, 6:
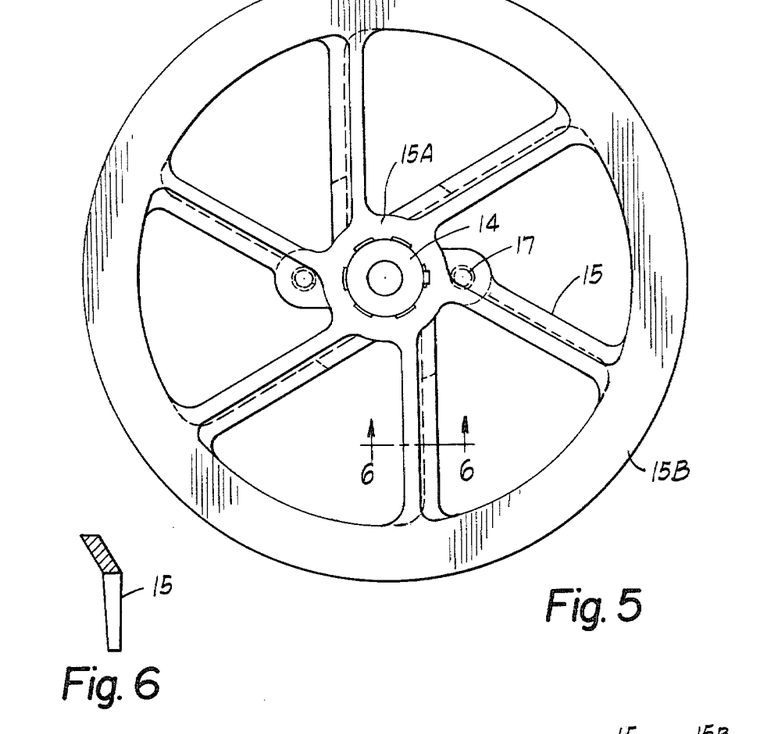
FIG. 5 is a plan view of the fan apart from the mechanism shown in the view of FIG. 1.
FIG. 6 is a cross-sectional view through a blade of the fan and is taken through the line 6—6 of FIG. 5.
Figure 7:
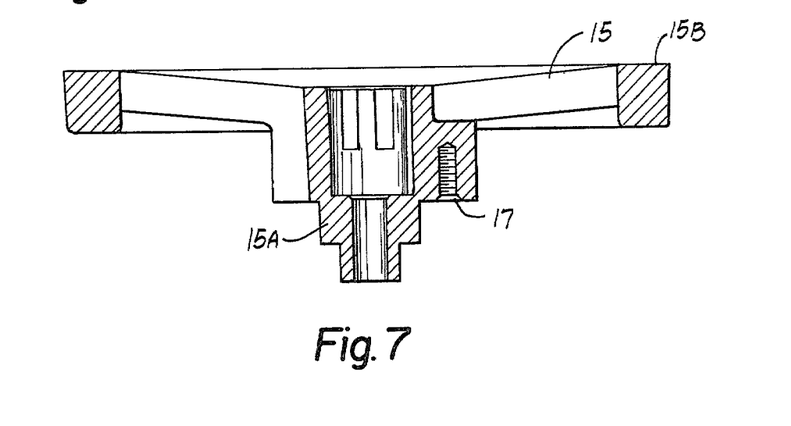
FIG. 7 is a longitudinal sectional view of the fan shown in FIG. 5 taken in a plan passing through the axis of the fan.

Secured to the shaft 14, and splined thereto so as to rotate with the shaft, is a fan 15. This fan 15 is best shown in FIGS. 5, 6 and 7 as removed from the mechanism to be shown alone. The fan 15 has a rim 15B joined by multiple spaced fan blades to a central hub 15A. The hub 15A is splined to the shaft 14 to cause rotation of the fan with the shaft. The different fan blades are oriented in respect to the direction of the rotation of the fan so as to blow or impel air downwardly about the mechanism within the cup member 13 for the purpose of blowing and expelling debris, such as particles of cut grass, oil and foreign material outwardly and away from the mechanism.

Mounted to the fan hub 15A concentrically of the shaft 14 is a steel clutch plate 16 by means of bolts 17.

This clutch plate 16 as illustrated is in the form of an inverted saucer having its mouth directed downwardly. A central opening in the clutch plate 16 accommodates the hub 15A. The clutch plate rotates with the hub 15A and with the shaft 14 to which it is splined, and therefore the clutch plate 16 is rotatively driven by the motor 11.

The outer peripheral border of the clutch plate 16 is inclined downwardly at an approximate angle of 45° to the general plane of the clutch plate 16, which plane is normal to the axis of the shaft 14. This ouer peripheral border provides on its under surface the inclined annular clutching surface 16A disposed as shown.

Rotatably mounted on the lower free end of shaft 14 is a rotatable plate member 18 having the configuration illustrated in FIGS. 1, 2, 3 and 4. This rotatable plate member 18 has upturned an outer flange portion 18A as illustrated and has the ribs and bosses pressed therein in the configuration shown. A central cylindrical portion 18C of the member 18 accommodates a bearing assembly 23 which is interposed between the lower end of hub 15A and the walls of cylindrical portion 18C. The rotatable plate member 18 is mounted on the hub 15A through the bearing assembly 23 in such manner that the shaft 14 may rotate free of the rotatable plate member 18 even when the plate member is braked and thus restrained against rotation.

A cutting blade 20 of usual form used in a rotary type lawn mower is bolted by bolts 22 and nuts 22A. This blade 20 is the rotatable working element on this machine known as a lawn mower. A spacer washer 19 is interposed between the blade 20 and the rotatable plate member 18. The arrangement is such that the rotatable plate member 18, washer 19, and blade 20 are joined as a unit and either rotate in unison with the shaft 14 or remain stationary or non-rotative together even while the shaft 14 and fan 15 may be rotating by the driving force of the motor 17.

A bolt 21 threadably secured to shaft 14 and fan hub 15A, together with a washer member 21A, extend through central openings in blade 20 and in spacer washer 19 to secure the inner race of bearing assembly 23 to the hub 15A.

Figure 3:
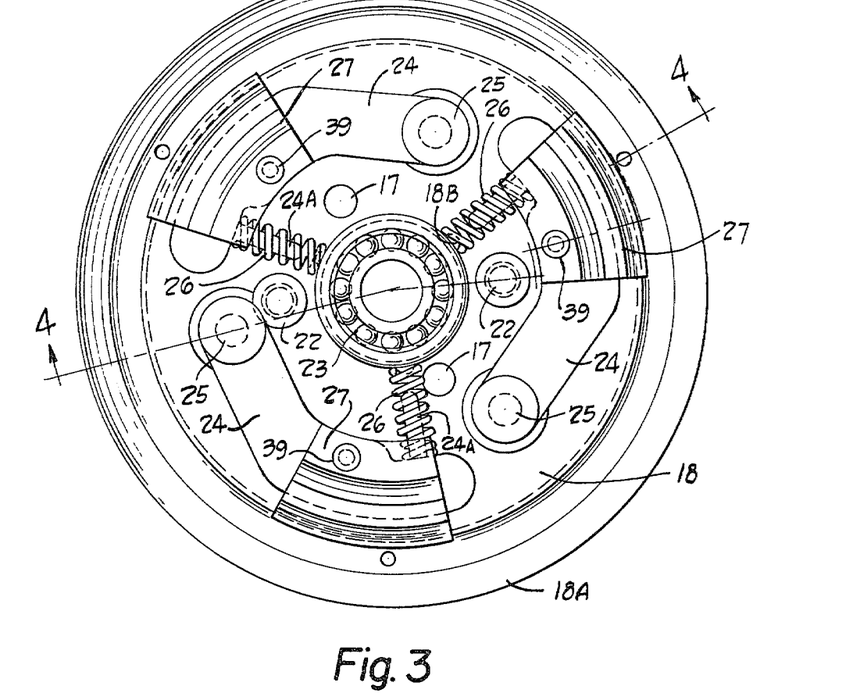
FIG. 3 is a plan view, partially in section, of the annular rotatable member apart from the mechanism shown in the view of FIG. 1 and which carries the friction elements of the clutch and brake mechanism.
Figure 4:
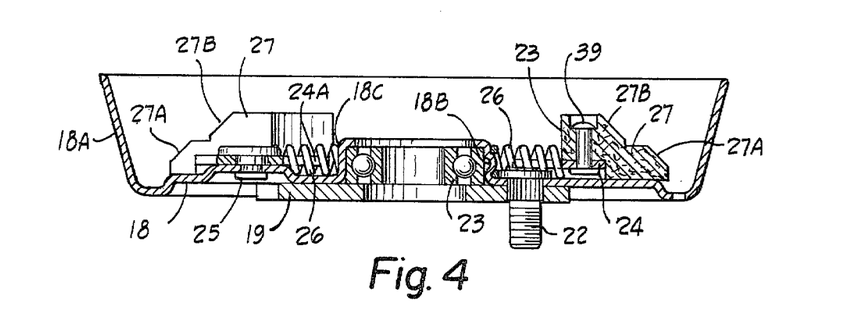
FIG. 4 is a longitudinal sectional view taken through the line 4—4 of FIG. 3.

Pivotally mounted by means of three pivot pins 25, respectively, to the rotatable plate member 18 are three steel carrier members having the angular configuration, as seen in the plan view of FIG. 3. Each of these three carrier members 24 has a finger portion 24A extending from the side of the outer free end of the respective carrier members 24 as better seen in the drawings.

Three compression springs 26 are mounted on the finger portions 24A, respectively, and extend radially inward to engage the central cylindrical portion 18C of the rotatable plate member 18. Small bosses 18B on the cylindrical portion 18C and equidistantly spaced around the cylindrical portion 18C accommodate the inward ends of springs 26 and thus maintain the springs in position. The bias of the springs 26 is such as to resiliently urge the carrier members 24 to swing on their respective pivot pins 25 radially outward.

Mounted on each of the carrier members 24 adjacent the outer free ends of each are friction elements 27. These friction elements are composed of molded plastic brake material variously composed of different compositions of resin, asbestos, lignin derivatives, powdered metal and other known brake material having appropriate friction and wear characteristics.

Each of these three friction elements has at its outward peripheral portion an inclined braking surface 27A of arcuate form and disposed at substantially a 45° angle to the plane of rotatable plate 18 which is normal to the axis of shaft 14.

Also each of these friction elements 27 spaced radially inward and on a higher level, as seen in the drawings, has an inclined clutching surface 27B disposed at substantially a 45° angle to the plane of rotatable plate member 18 which is normal to the axis of shaft 14. The inclination of clutching surface 27B is such as to substantially complement the inclined surface 16A of clutch plate 16 so that they may closely engage angle the length of clutching surface 27B.

Figure 8:
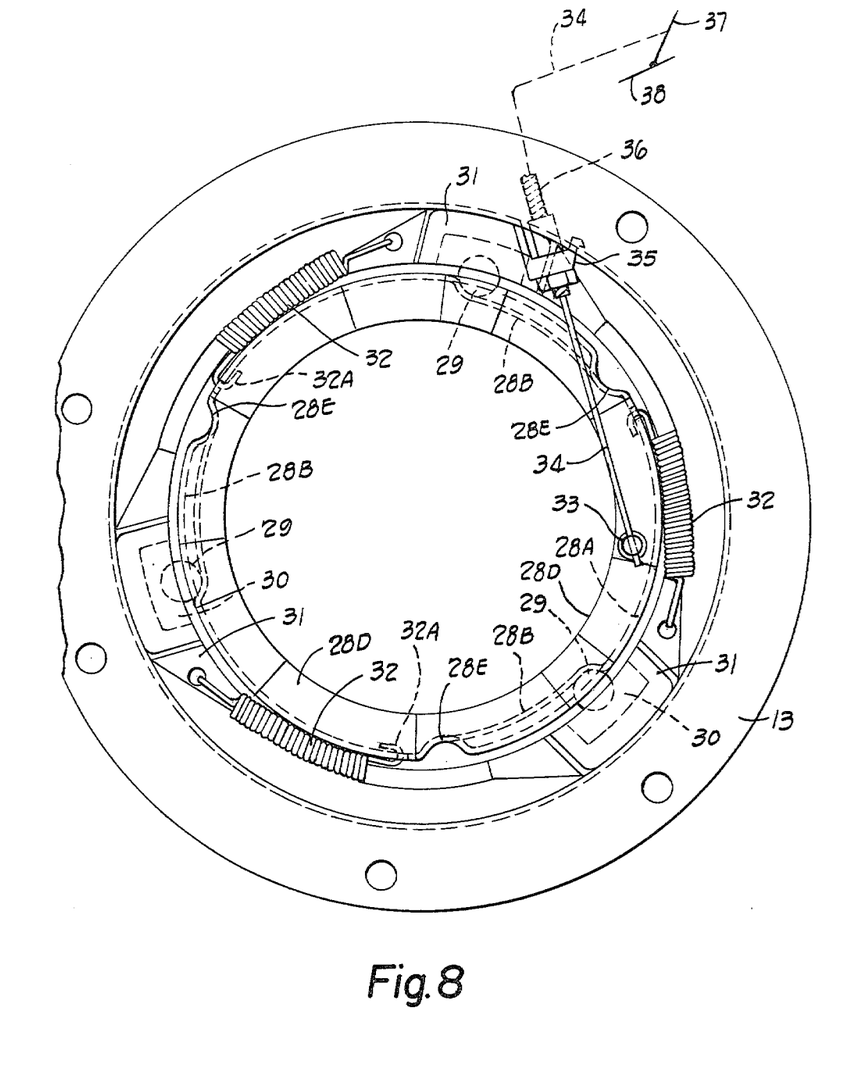
FIG. 8 is a plan view, partially in section, of the brake plate in the mechanism showing the rotative position of the brake plate in the cup member or housing extension when the parts are in the braked and de-clutched positions.

An annular brake plate 28 is disposed concentrically of the hub 15A and shaft 14. The brake plate 28 has a cylindrical portion 28A and an inturned flange portion 28D about its upper end. The cylindrical portion 28A has equidistantly spaced therearound three helically disposed grooves 28B formed in the wall thereof in the manner illustrated in FIGS. 8, 9 and 10. Vertically directed ducts or openings 28A extend downwardly in the wall to provide ingress into the respective grooves 28B. At the bottom or lower free end of the brake plate the plate is flared outwardly to provide the inclined braking surface 28C on its underneath or interior surface. This braking surface 28C is inclined at approximately a 45° angle to the transverse plane of the mechanism, which plane is normal to the axis of shaft 14. The inclination of braking surface 28C complements the inclined braking surfaces 27A of the friction elements 27 so that they may closely engage along the length of braking surface 27A.

Carried by three nylon socket members 30 equidistantly spaced apart mounted on anchoring brackets 31 formed radially inward of cup member 13, are three steel balls 29 which protrude from nylon socket members 30 radially inward to the cylindrical portion 28A of the brake plate 28. The balls 29 interfit with the helical grooves 28B so as to ride along the incline of the helical grooves 28B. The balls 29 may be introduced into the grooves 28B through the ducts 28E upon longitudinal movement of brake plate 28 relative to the cup member 13 carrying the balls 29.

A screw reaction is provided by the balls 29 in the grooves 28B whereby a rotational movement of the brake plate 28 is translated into a longitudinal movement of the brake plate 28 relative to the cup member 13 and housing 12. Thus, rotation of brake plate 28 is translated into an up or down longitudinal movement of the brake plate parallel to the axis of shaft 14, the direction of the longitudinal movement up or down being dependent on the direction of the rotational movement imparted to the brake plate.

Tending to impart a rotational movement to the brake plate 28 so as to be translated into a longitudinal movement which acts to lower the brake plate downwardly such as to the position shown in FIG. 1, are three extension springs 32. Each of these equidistantly spaced springs 32 have one end anchored to anchoring brackets 31 on cup member 13 by hooked portions 32B secured to the respective brackets 31. Each of these springs 32 have their opposite end anchored by hooked portions 32A to the brake plate 28. The bias of these extension springs 32 is such as to impart a rotational movemwent to the brake plate 28 so as to move to the position shown in FIG. 8, wherein the brake plate 28 is shown in braking position shown in FIG. 1.

Figure 2:
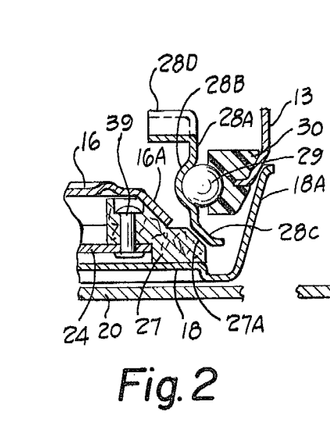
FIG. 2 is a partial sectional view showing a portion of the view in FIG. 1 but illustrating the parts in unbraked and clutched positions.
Figure 9:
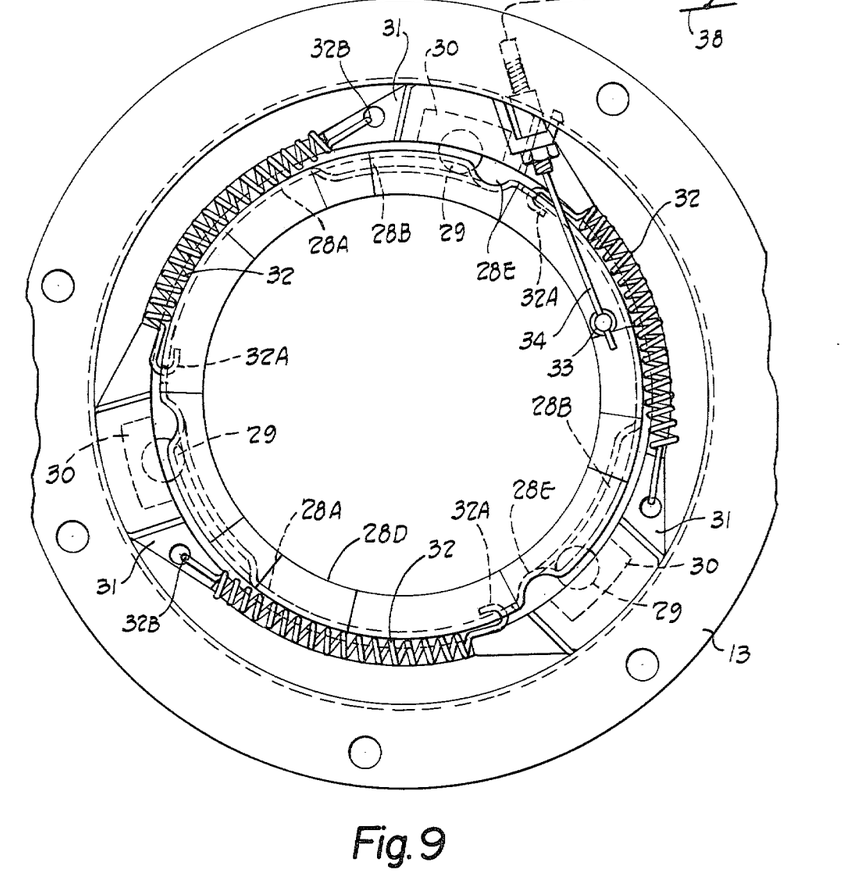
FIG. 9 is a plan view somewhat similar to that of FIG. 8 but showing the rotative position of the brake plate when the parts are in the unbraked and clutched positions.
Figure 10:
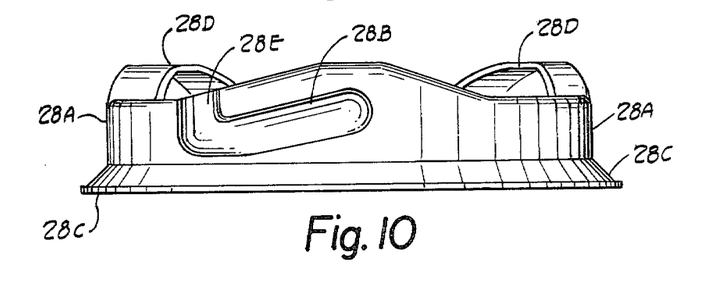
FIG. 10 is a side view of the brake plate removed from the mechanism shown in FIG. 1.

For overcoming or opposing the resilient bias of springs 32 and thus to permit the parts to be in the unbraked positions shown in FIGS. 2 and 9, a cable 34 is secured by an anchoring pin 33 to the inturned flange portion 28D of brake plate 28. This cable 34 extends through a fair lead 35 in one of the nylon blocks 30 from where it extends through a sheath or tubular casing 36 to a location externally of the housing 12 and cup member 13. A common use of the improved clutch and brake mechanism is its use in conjunction with a "dead-man" control. For diagramatically illustrating this use, there is shown, in FIGS. 8 and 9, the cable externally of the housing in the form of a braken line which is connected to a "dead-man" control lever 37 swingably mounted on a supporting structure 38. Typically in a lawn mower use of the invention, the supporting structure 38 is a handle of the mower held by the operator of the mower, and the lever 37 is pivotally mounted on the handle in position to be simultaneously held and pressed against the handle 38 by the operator. Upon release of the "dead-man" control lever 37 by the operator the force of springs 32 takes over as there is no longer tension on cable 34 and the brake plate moves rotationally from its non-braking position shown in FIG. 9 to its braking position shown in FIG. 8.

Thus, the movement of the brake plate 28 is between the braking position of FIG. 1 to the non-braking position of FIG. 2.

It is to be noted tht ythe radial spacing between inclined braking surface 27A and the inclined clutching surface 27B is such that when the braking surface 27A is engaged by inclined surface 28C of the brake plate 28, the engaged friction element 27 is swung on its respective carrier member 24, in opposition to its respective spring 26, radially inward sufficiently that inclined clutching surface 27B is moved away from, and out of clutching engagement with inclined clutching surface 16A of clutch plate 16.

Upon the raising of the brake plate 28, by translating rotational movement thereof to longitudinal movement, from its position shown in FIG. 1 to its position shown in FIG. 2, the friction elements 27 swing out under the urging of springs 26 to their positions shown in FIG. 2 where the inclined clutching surfaces 27B of the friction elements 27 clutchingly engage the inclined surface 16A of clutch plate 16.

Thus, by this mechanism there is assurance that upon the declutching action, the braking action almost immediately occurs so that any rotation of the blade 20 thereupon and quickly ceases. This assures safety in the use of the lawn mower or other machine having a motor-driven rotatable working element. Also, upon the unbraking operation the clutching action almost immediately occurs and the mower or other machine may be operated. The "dead-man" control is particulaly adapted for use in controlling the mechanism here disclosed and utilizing its advantages.

It may be noted that by the arrangement shown and described the braking action tends to be self-energizing. After the brake plate and braking surfaces of the friction elements initially engage, the frictional drag or pull tends to cause the frictional elements, mounted by the rivets 39 on carrier members 24, to shift outwardly to fuller and more complete braking engagement with the brake plate. The brake plate force directed toward the friction element also increases because of the re-inforcement of the screw action of the brake plate. Similarly, there is a self-energizing action provided in the clutching action when the brake plate is raised out of braking position, in that initial clutching engagement of the frictional elements with clutching surface of the clutch plate tends to cause the frictional elements to shift to fuller and complete clutching engagement with the clutch plate. This self-energizing of the clutching action is introduced by centrifugal force imparted on the friction elements.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A clutch and brake mechanism for a rotary type lawn mower having a motor mounted on the mower housing, a motor-driven shaft extending from the housing, and a cutting blade mounted at the free end of the shaft and adapted to be rotated by the shaft, the improvement comprising in combination, a rotatable member concentrically mounted about said shaft adjacent the free end of the shaft and adapted to be secured to the blade to rotate with the blade, a plurality of carrier members pivotally mounted to said rotatable member to swing in planes normal to the axis of said shaft, a plurality of friction elements each mounted on one of said carrier members to swing therewith radially outwardly and inwardly relative to the shaft axis, first resilient members operatively connecting said rotatable member and each of said carrier members to resiliently swing in a direction moving the friction elements radially outwardly from the axis of the shaft, each of said friction elements having an inclined braking surface and an inclined clutching surface, said braking surfaces and said clutching surfaces being disposed in concentric arcs spaced from each other, an annular clutch plate concentrically mounted about said shaft and mounted to rotate with the shaft, said clutch plate having an engaging portion adapted to clutchingly engage the inclined clutching surfaces of said friction elements to provide driving engagement between the clutch plate and the friction elements, an annular brake plate concentrically mounted about said shaft, said brake plate having an engaging portion adapted to brakingly engage the inclined braking surfaces of said friction elements to provide braking engagement between the brake plate and the friction elements, a cup member carried by said mower housing and extending from the same, a camming assembly carried by the cup member and operatively engaging said brake plate for translating circular movement of the brake plate to longitudinal movement parallel to the axis of the shaft toward and away from the friction elements, second resilient members operatively connecting said brake plate and said cup member for resiliently urging the brake plate in a rotative direction translated to longitudinal movement toward, and into engagement with, the inclined braking surfaces of the friction elements, and a connecting member connected to the cup member adapted to be operated in opposition to the urging of said second resilient member to rotate the brake plate in a direction to move the plate member longitudinally away from the friction elements to disengage the braking surfaces of the friction elements, the radial spacing of the braking surfaces from the clutching surfaces of the friction elements being such that upon the braking engagement of the brake plate and braking surfaces, the friction elements are sufficiently pressed to swing radially on the carrier members a radial inward distance to disengage the clutching surfaces of the friction elements from the clutch plate and thereby discontinue rotation of the rotatable member and blade by said shaft.

2. A clutch and brake mechanism as claimed in claim 1 and in which the said camming assembly includes protruding members carried by the said cup member and protruding radially inward thereof, and includes helically disposed grooves in the brake plate for accommodating in the grooves said protruding members to provide a screw reaction between the cup member and the brake plate for translating the rotative movement of the brake plate into longitudinal movement of the brake plate toward and away from the friction elements.

3. A clutch and brake mechanism as claimed in claim 2 and in which the said camming assembly includes a plurality of ball retaining members carried by the cup member and spaced apart around the cup member, a plurality of balls each carried by a ball retaining member and protruding therefrom radially inward of the cup member, and includes a plurality of helically disposed grooves in the wall of the brake plate and facing radially outward to accommodate said balls, respectively, in each of said grooves to provide said screw reaction between the cup member and brake plate.

4. A clutch and brake mechanism as claimed in claim 1 and including a fan member disposed within the cup member and concentrically mounted on said shaft to rotate therewith and axially spaced from said friction elements to blow debris away from the said clutch surfaces and brake surfaces during driving operation of the mower motor.

5. A clutch and brake mechanism as claimed in claim 4 and in which said fan member includes a hub mounted on the shaft to rotate therewith and in which the clutch plate is secured to the hub to rotate therewith.

6. A clutch and brake mechanism as claimed in claim 4 and including a bearing assembly mounted on the free end of the shaft between the shaft and said rotatable member to permit free rotation of the shaft during braking engagement of the brake plate with the braking surfaces of the friction elements carried by the rotatable member.

7. A clutch and brake mechanism as claimed in claim 1 and in which said first resilient members are compressive springs interposed between said rotatable member and said carrier members, respectively, and in which said second resilient members are extension springs interconnecting said brake plate and said cup member.

8. A clutch and brake mechanism as claimed in claim 1 and in which the brake plate has an inclined surface complementing the braking surfaces of the friction elements to brakingly engage the same upon movement of the brake plate toward and against the friction elements, and in which the clutch plate has an inclined surface complementing the clutching surface of the friction elements to clutchingly engage the same upon movement of the friction elements toward and against the clutch plate.

9. In a clutch and brake mechanism, accommodated in a housing, for clutching and de-clutching a working element from driving connection with a motor-driven shaft and for braking the working element upon de-clutching the working element and unbraking the working element upon the clutching of the working element, the improvement comprising the combination of a rotatable plate member concentrically mounted about said shaft to permit the shaft to rotate free of movement of the rotatable plate member and to permit the rotatable plate member to rotate with the said shaft, said rotatable plate member being adapted to carry the said working element secured thereto for rotation and for braking of the rotatable plate member and working element together, friction elements carried by the rotatable plate member and mounted to be shiftable radially inward and outward relative to said shaft, said friction elements having braking surfaces and clutching surfaces, said braking and clutching surfaces being spaced apart radially of said shaft, said friction elements being biased to move radially outward of said shaft, a clutch plate carried by said shaft to rotate with the shaft, a brake plate carried by the housing concentrically of said shaft, a camming assembly interposed between said housing and said brake plate for translating rotative movement of the brake plate to longitudinal movement parallel to the shaft toward and away from said friction elements, said brake plate being biased to rotate in a rotative direction translated to a longitudinal movement toward the friction elements, the brake plate being rotatable in opposition to the said bias on the clutch plate in a rotative direction translated to longitudinal movement away from the friction elements, the longitudinal movement of the brake plate toward the friction elements engaging the brake plate with the braking surfaces of the friction elements to brake rotation of the rotatable plate member and the working element carried thereby and also shifting the friction elements radially inward to disengage the clutching surfaces of the friction elements from the said clutch plate mounted on the said shaft to terminate driving of the rotatable plate member and the working element carried thereby.

10. The improvement claimed in claim 9 and in which the said camming assembly comprises protruding members carried by the housing and spaced apart concentrically of said shaft and helical arranged grooves carried by the brake plate and accommodating said protruding members in a screw structure arrangement for providing the said longitudinal movement upon rotation of the brake plate.

11. The improvement claimed in claim 9 and including a cup member providing an extension of said housing concentrically of said shaft and carrying said camming assembly disposed concentrically of said shaft at a longitudinal distance from said friction elements.

12. The improvement claimed in claim 9 and in which the bias of said friction elements is provided by compression springs interposed operatively connected between said rotatable plate member and said friction elements for resiliently urging the friction elements to shift radially outward relative to said shaft, and in which the bias of said brake plate is provided by extension springs operatively connected to said housing and to said brake plate for resiliently urging the brake plate to rotate in a direction translated to longitudinal movement toward said friction elements.

13. The improvement claimed in claim 9 and in which said brake plate has a substantially cylindrical portion extending concentrically of said shaft, and in which a cup member forming an extension of said housing is disposed concentrically of said shaft and radially outward of said cylindrical portion of the brake plate, and in which said camming assembly is interposed between said cup member and said cylindrical portion.

14. The improvement claimed in claim 9 and in which the friction elements are each mounted to the rotatable plate member on pivots, respectively, spaced from and having axes parallel to, the axis of said shaft, said friction elements being swingable on their respective axes toward and away from the said shaft, and in which the braking and clutching surfaces of the friction elements are disposed in concentric arcs about the axis of said shaft.

15. The improvement claimed in claim 9 and in which the braking surfaces and clutching surfaces of each friction element are disposed in arcs concentric about a common axis for each friction element, and in which the braking surface is disposed radially outward from the said common axis a greater distance than the clutching surface is disposed radially outward from the same said common axis.

16. The improvement claimed in claim 9 and in which the braking surface and clutching surface are disposed in arcs radially spaced from each other and are inclined at acute angles to the axis of said shaft and radially outwardly away from said shaft.

17. In a power transmission device having a rotatable working element adapted to be rotated by a shaft rotatably driven by a prime mover mounted to a housing, the combination of a friction element shiftable relative to the axis of said shaft, a clutching plate carried by the said shaft to rotate therewith, a braking plate carried by the said housing, camming means carried by said housing and interengaging with said braking plate for moving said braking plate in a phantom cylindrical form concentric with said shaft, first biasing means urging said braking plate to move in a first direction, operating means for moving said braking plate in opposition to said first biasing means in an opposite direction, said friction element having surfaces to be alternately engaged either by said clutching plate or by said braking plate, in the engaged condition of the friction element the spacing between the clutching plate and the corresponding surface of the friction element that is engageable by the clutching plate being different from the spacing between the braking plate and the corresponding surface of the friction element that is engageable by the braking plate to assure a difference between the occurrence of the engagement of the friction element with said clutching plate and the occurrence of the friction element with said braking plate, engagement of the friction element by the braking plate shifting the friction element relative to the axis of said shaft to cause simultaneous disengagement of the friction element from the clutching plate.

18. The combination claimed in claim 17, and in which said friction element is composed of segments disposed around the axis of the shaft, each of the segments is mounted on an axis spaced radially from, and parallel to, the axis of the shaft, each of the segments carrying the said surfaces, said surfaces being disposed in arcs concentric with the axis of the said shaft.

* * * * *